(12) United States Patent
Link et al.

(10) Patent No.: US 6,725,561 B2
(45) Date of Patent: Apr. 27, 2004

(54) APPARATUS FOR THE TREATMENT OF WORKPIECES

(75) Inventors: Kersten Link, Grafenau (DE); Wolfgang Renner, Boblingen (DE)

(73) Assignee: Eisenmann Maschinenbau KG (DE)

( * ) Notice: Subject to any disclaimer, the term of this patent is extended or adjusted under 35 U.S.C. 154(b) by 0 days.

(21) Appl. No.: 10/348,611

(22) Filed: Jan. 21, 2003

(65) Prior Publication Data

US 2003/0140516 A1 Jul. 31, 2003

(30) Foreign Application Priority Data

Jan. 23, 2002 (DE) ......................... 102 02 377
Oct. 23, 2002 (DE) ......................... 102 49 243

(51) Int. Cl.[7] ............................................... F26B 19/00
(52) U.S. Cl. ............................. 34/60; 34/201; 34/242; 34/666; 198/860.3; 118/326
(58) Field of Search ......................... 34/666, 667, 60, 34/201, 417, 242, 202; 118/324, 326; 198/678.1, 860.3, 495

(56) References Cited

U.S. PATENT DOCUMENTS 3,563,203 A * 2/1971 Stiltner ...................... 118/324
3,749,229 A * 7/1973 Napadow ................... 198/495
4,207,833 A * 6/1980 Napadow ................... 118/324

FOREIGN PATENT DOCUMENTS

DE 198 48 946 A1 10/1998

\* cited by examiner

Primary Examiner—Henry Bennett
Assistant Examiner—Camtu Nguyen
(74) Attorney, Agent, or Firm—King & Jovanovic, PLC

(57) ABSTRACT

An apparatus for treating workpieces comprises a treatment chamber enclosing a treatment zone for workpieces. A conveyor guides workpieces through the chamber. Said conveyor comprises drive elements located outside the chamber, and a carrier arm, extending through a slot along the conveyor's path of motion, in a wall of the chamber. A sealing arrangement comprises a first set of spring strips, which overlap laterally and are attached on one side of the slot to the wall, and an opposing second set of spring strips attached on the other side of the slot to the wall. In a resting position, the end zones of the spring strips overlap. Two deflecting devices, which move together with the carrier arm by the conveyor, open the sealing arrangement proximate the carrier arm by resiliently bending apart the spring strips. After passage of the carrier arm, the spring strips return to a sealing position.

13 Claims, 7 Drawing Sheets

APPARATUS FOR THE TREATMENT OF WORKPIECES

BACKGROUND OF THE INVENTION

1. Field of the Invention

The invention relates to an apparatus for the treatment of workpieces comprising a treatment chamber, a conveyor and a sealing arrangement.

2. Background Art

The industrial treatment of large numbers of workpieces, especially for surface treatment but also for drying workpieces, has long preferentially been performed with apparatuses which continuously or discontinuously guide the workpieces through a treatment zone with the aid of a conveyor, because such apparatuses have an elevated capacity and may readily be incorporated into a production line. The treatment zone is here located in a treatment chamber, which frequently takes the form of a booth, the walls and ceiling of which divide the external atmosphere from the internal atmosphere of the treatment chamber and in particular prevent any escape of the treatment medium and optionally heat from the treatment chamber. Hereafter and in the claims, the term "walls" will be used for simplicity's sake to denote not only the walls strictly speaking but also the ceiling.

The treatment medium may comprise a treatment liquid, as is the case for example when coating workpieces or in preparative processes for coating. The treatment medium may, however, in principle also comprise gases, vapours or liquid or powder mists, as are present in spray booths, for example.

A second function of the treatment chamber walls is to prevent dirt from entering the treatment zone from outside. Care is in particular taken to ensure that those components of the conveyor which may possibly release contaminants, in particular the drive components, are arranged outside the treatment chamber. In order to carry the workpieces, such conveyors must comprise a carrier arm which extends through one wall of the treatment chamber and on the inner end of which the workpieces are held. To this end, the treatment chamber wall must comprise a slot which extends along the conveyor's path of motion and which is closed by a separate sealing arrangement. This sealing arrangement is designed such that it opens locally in the area of the carrier arm.

In known apparatuses of the above-stated type, resilient sealing lips are used as the sealing arrangements, but such lips are not always reliable.

DE 198 48 946 C2 describes a different treatment apparatus of this type. In this latter apparatus, the sealing arrangement comprises a plurality of segmented sealing elements arranged adjacent to one another which overlap in the lateral direction and are pivoted about swivel pins to permit passage of the carrier arm. Such swivel pins are, however, not always desired.

The object of the present invention is accordingly to develop an apparatus of the above-stated type in such a manner that the slot between the two wall portions is reliably sealed, the sealing arrangement nevertheless operating reliably while requiring little maintenance.

SUMMARY OF THE INVENTION

Said object is achieved by an apparatus for the treatment of workpieces comprising a treatment chamber, a conveyor, a sealing arrangement, and a first and second deflecting device. The treatment chamber comprises at least one wall and comprises the treatment zone for the workpieces. The conveyor, which guides the workpieces through the treatment chamber, further comprises: at least one conveyor element outside the treatment chamber; and at least one carrier arm, which extends through a slot, extending along the conveyor's path of motion, in the at least one wall of the treatment chamber. The sealing arrangement seals the slot in the at least one wall of the treatment chamber. The sealing arrangement is capable of being opened in each case locally in the vicinity of the carrier arm to allow passage of the carrier arm. Further the sealing arrangement comprises a plurality of mobile sealing elements.

Additionally, the sealing arrangement further comprises a first set of springs, which overlap laterally and are attached in an area remote from the slot to a portion lying on one side of the slot of the at least one wall of the treatment chamber and a second set of spring strips, which overlap laterally and are attached in an area remote from the slot to a portion lying on the other side of the slot of the at least one wall of the treatment chamber. In their resting position, the mutually facing end zones of the spring strips belonging to the first set and of the spring strips belonging to the second set overlap resiliently.

The first deflecting device is provided which is movable by the conveyor together with the carrier arm and, when moved, engages beneath the first set of spring strips and bends them out resiliently in such a manner that the carrier arm can pass through the first set of spring strips. Similarly, the second deflecting device is provided which is movable by the conveyor together with the carrier arm and, when moved, bends out the second set of spring strips resiliently in such a manner that the carrier arm can pass through the second set of spring strips.

Thus, according to the invention, no parts which move as a whole are used as the sealing element. Opening of the sealing arrangement is based solely on resilient flexing of the spring strips. The deflecting devices are designed such that, when they are moved together with the carrier arm, they bend the upper and lower spring strips apart in the manner of a plough, so permitting passage of the carrier arm. The spring strips subsequently automatically return to their sealing resting position. In the event that workpiece treatment involves exposure to liquid, the inclination of the spring strips belonging to the two sets may in each case be selected and maintained such that any sprayed liquid which impinges on the spring strips flows back into the interior of the treatment chamber.

The spring strips preferably consist of spring steel, stainless steel or an optionally reinforced plastic.

Preferably, a shield is provided, which is movable together with the carrier arm and covers that zone of the sealing arrangement in which the spring strips are bent out of their resting position. This shield thus provides additional protection from treatment medium, in particular treatment liquid, escaping from the area of the sealing arrangement which is opened locally in the vicinity of the carrier arm.

The deflecting devices are preferably strips of sheet metal which are bent in such a manner that their surface extends everywhere approximately parallel to the areas of the spring strips lying thereagainst. In this manner, the deflecting devices have a guidance action which causes little wear and generates little noise.

It is furthermore convenient for the deflecting devices to be guided such that they lie against the spring strips everywhere at approximately the same distance from the edges thereof. The distance between that point on the spring strips at which the deflecting devices engage and the edge of the spring strips at which they are attached thus remains approximately constant everywhere.

A particularly preferred embodiment of the invention is one in which the slot between the first portion and the second portion of the wall of the treatment chamber is additionally closed on the outside by a bellows and a deflector is provided, which is movable with the carrier arm and comprises at least one sloping face, against which one edge of the bellows rests locally and which displaces the edge of the bellows in such a manner that the carrier arm can pass through the bellows.

The bellows are preferably used where a maximally good, even gas-proof, separation is desired between the external atmosphere and the internal atmosphere of the treatment chamber. The bellows is still more capable than the sealing arrangement consisting of spring strips of preventing the escape of vapours, mists and condensates; gas leakage losses can be kept so low that it is possible to maintain a different pressure within the treatment chamber than in the external atmosphere or in the zone between the spring strips and the bellows.

Finally, it is particularly convenient if the deflecting devices are configured symmetrically with regard to a plane perpendicular to the direction of conveying in such a manner that they are effective in both the forwards and backwards direction of the conveying motion.

The treatment chamber may, for example, be a booth in which the workpieces are surface treated, in particular coated, wherein the wall in which the slot is located is a substantially vertical wall of the booth.

In this case, it may be particularly favourable if the spring strips belonging to the different sets are bent out in different directions by the deflecting devices.

The treatment chamber may, however, also in particular be the chamber of a dryer or oven, wherein the wall in which the slot is located is the ceiling of the dryer or oven chamber. In this case, the primary function of the sealing arrangement is to insulate the dryer or oven chamber thermally and to prevent the escape of the hot internal atmosphere and the penetration of cold ambient air.

In this case, it is frequently favourable if the spring strips belonging to the different sets are bent out in the same direction by the deflecting devices.

BRIEF DESCRIPTION OF THE DRAWINGS

Exemplary embodiments of the invention are shown in greater detail below in the drawings, in which.

DETAILED DESCRIPTION OF THE DRAWINGS

Figure 1:
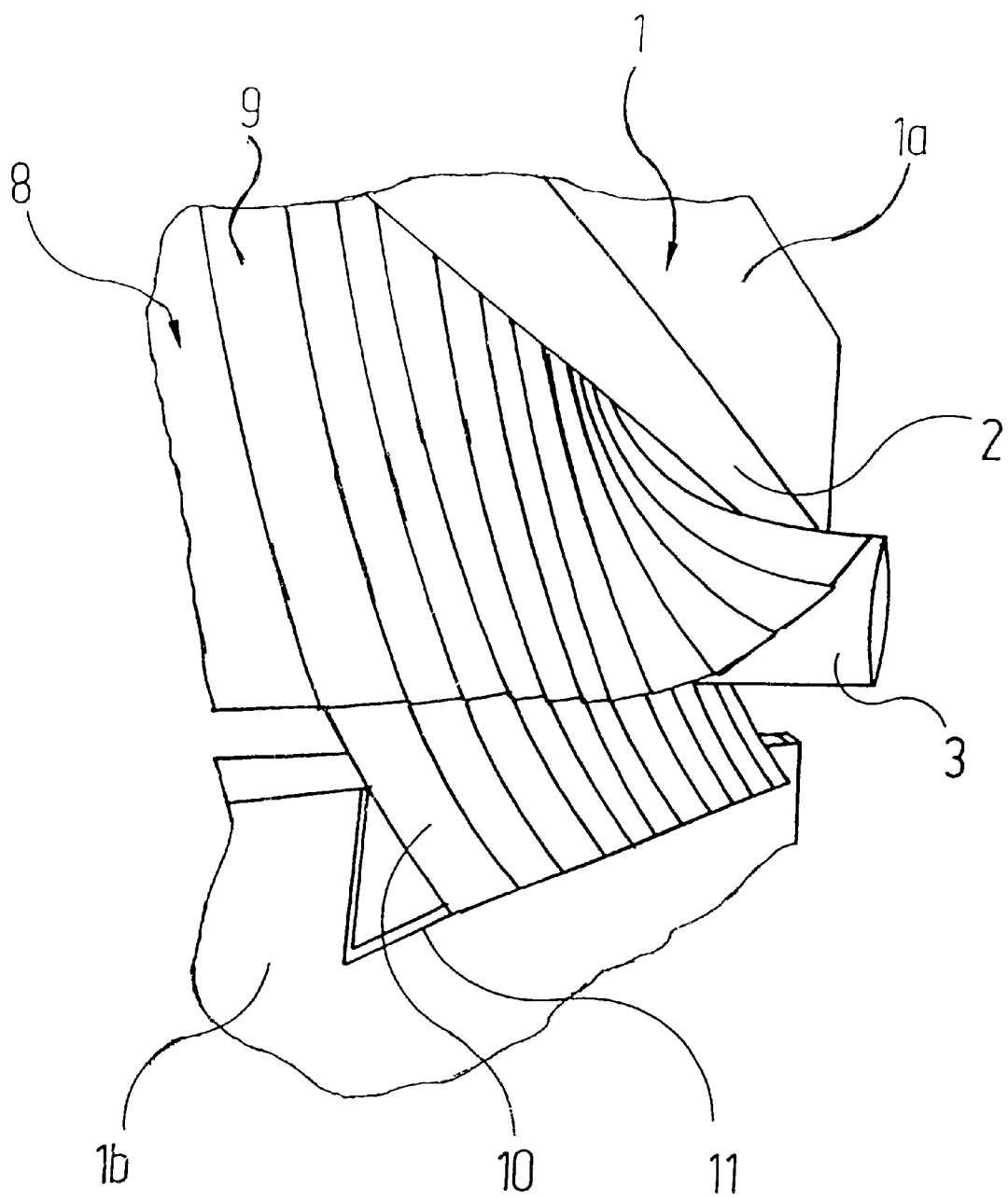
FIG. 1 is a perspective internal view of a portion of the wall of a workpiece coating booth.
Figure 2:
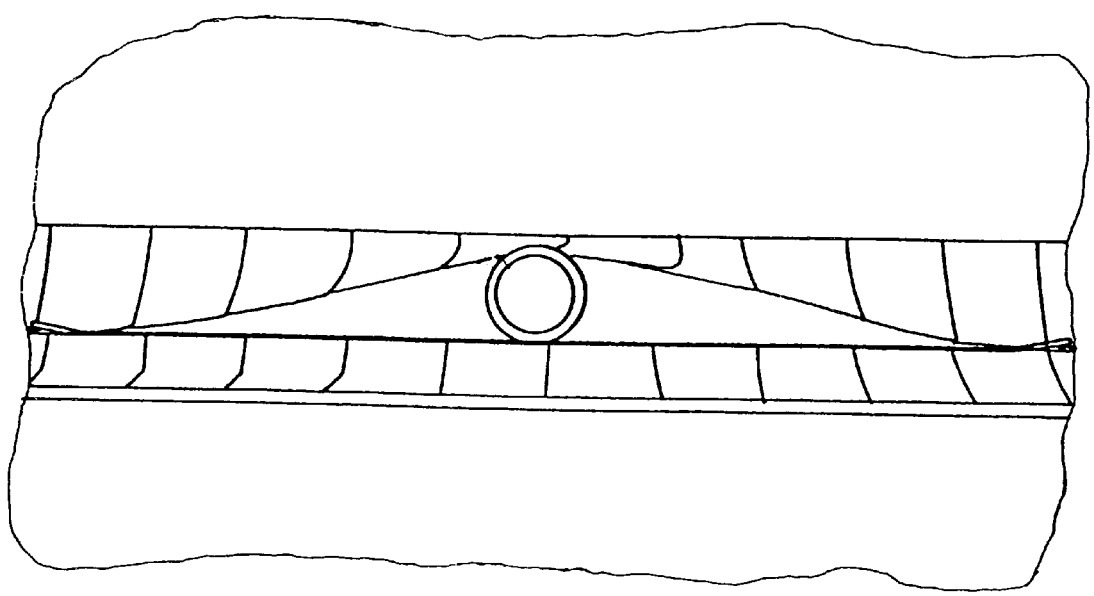
FIG. 2 is the plan view of the portion of the wall shown in FIG. 1.

While this invention is susceptible of embodiment in many different forms, there is shown in the drawings and described herein in detail a specific embodiment with the understanding that the present disclosure is to be considered as an exemplification of the principles of the invention and is not intended to limit the invention to the embodiment illustrated.

In FIG. 1, reference numeral 1 denotes the wall of a booth for dip coating vehicle bodies. The wall 1 has an upper wall portion 1a and a lower wall portion 1b, which are separated one from the other by a horizontal slot 2. A carrier arm 3 projects from the outside inwards through the slot 2 between wall portions 1a and 1b. The workpieces to be treated (not shown) can be attached to the carrier arm 3.

Figure 5:
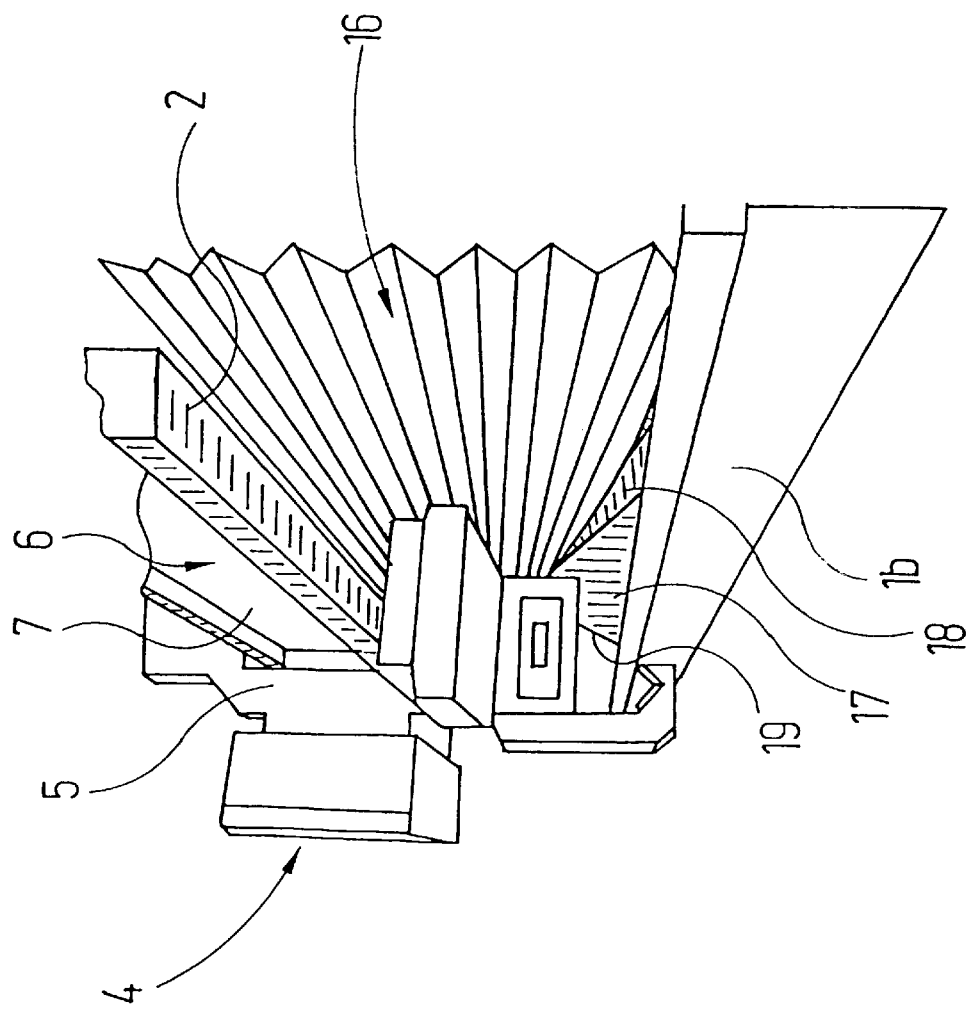
FIG. 5 is a perspective external view of the portion of the booth wall shown in FIGS. 1 to 3.

The outer end of the carrier arm 3, i.e. the opposite end to that shown in FIG. 1, is connected to a conveying system, which in the present exemplary embodiment takes the form of en electric telpher line 4. The electric telpher line 4 is shown in FIG. 5. The telpher line 4 comprises a travelling mechanism 5, which contains a drive motor, and engages around a carrying and guide rail 6 which extends in the area of the upper wall portion 1a along the upper edge of the slot 2 between the upper housing portion 1a and the lower housing portion 1b. Contact lines, not shown in the drawing, are provided on the somewhat recessed side surface 7 of the carrying and guide rail 6, which contact lines serve to supply electric power to the drive motor of the electric telpher line 4 and to supply digital data for controlling the electric telpher line 4. Under the control of commands issued by a central computer and optionally of commands which are stored in memory means of the electric telpher line 4 itself, the electric telpher line 4 moves along the guide and carrying rail 6, wherein the carrier arm 3, which, as shown in FIG. 1, projects into the interior of the treatment booth, is likewise moved along the slot 2, so taking with it the workpiece which is attached thereto and, for example, guiding it through a treatment bath.

So that no liquids, gases or vapours can escape from the interior of the treatment booth or can penetrate therein, the slot 2 between the upper wall portion 1a and the lower wall portion 1b is closed by a sealing arrangement, denoted by the overall reference numeral 8. The sealing arrangement 8 comprises an upper set of spring strips 9 which overlap one another in the lateral direction and are attached by the upper edge thereof to the upper wall portion 1a. The spring strips 9 consist of spring steel or another resilient material. The material should, however, be dimensionally stable in such a manner that, on contacting an article on a narrow side, it does not "dent" but instead only bends outwards over the entire surface, as is shown in the drawing.

The sealing arrangement 8 moreover comprises a lower set of spring strips 10 which are attached by the lower edge thereof to an angle plate 11 which is in turn attached to the lower wall portion 1b. In this manner, when in their resting position, the spring strips 11 are inclined relative to vertical, specifically in such a manner that the surfaces formed thereby return the sprayed liquid into the interior of the treatment booth.

The lower ends of the upper spring strips 9 overlap the upper ends of the lower spring strips 10, specifically in such a manner that, in their resting position, they lie resiliently against the side of the lower spring strips 10 which faces towards the interior of the treatment booth.

In the vicinity of the point at which the carrier arm 3 breaks through the spring strips, the upper spring strips 9 and the lower spring strips 10 are bent out from their resting position, in which the end zones lie against one another. This proceeds with the assistance of two deflecting devices 12, 13 which can in particular be seen in FIG. 3.

The upper deflecting device 12, which cooperates with the upper spring strips 9, assumes the form of a strip of sheet metal, which is guided substantially symmetrically over the carrier arm 3 and is turned in such a manner that, in the area of the two opposite ends thereof, it has an orientation which corresponds to the inclination of the upper spring strips 9 in their resting position, while in the area in which it is attached to the carrier arm 3, it substantially lies against the profile of the carrier arm 3, i.e. is substantially horizontal. The outer ends of the upper deflecting device 12 are attached to a sheet metal shield 14, which is in turn connected with the electric telpher line 4 and is moved together therewith. The sheet metal shield 14 is likewise inclined relative to vertical in such a manner that liquid impinging on the sheet metal shield 14 runs back into the interior of the treatment booth.

Figure 3:
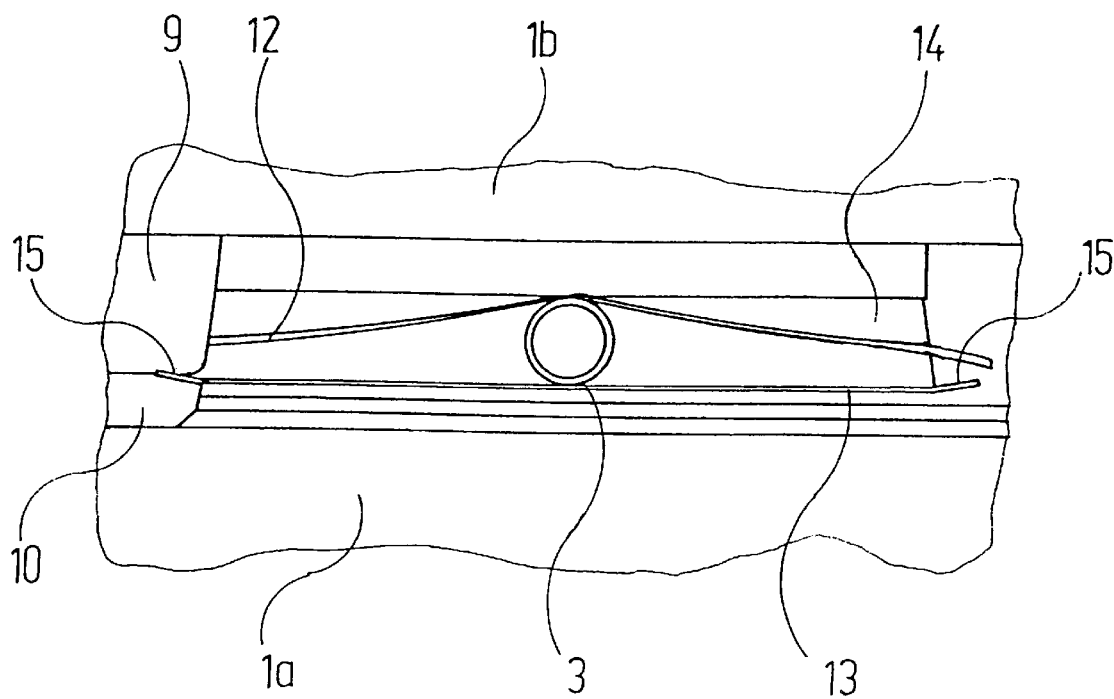
FIG. 3 is a view, similar to FIG. 2, but with part of the sealing arrangement removed.

When the carrier arm 3 and thus also the sheet metal shield 14 together with the upper deflecting device 12 are moved by the electric telpher line 4 along the slot 2, e.g. in FIG. 3 to the left, the advancing end of the upper deflecting device 12 engages beneath the adjacent upper spring strip 9, in the lower zone thereof. This spring strip 9 is thus lifted from beneath by the upper deflecting device 12, and is so moved apart from the corresponding lower spring strip 10. As the upper deflecting device 12 continues to move, the upper spring strip 9, as is clearly shown in FIG. 1, is lifted to such an extent that it slides past above the carrier arm 3. The distance between the upper deflecting device 12 and the sheet metal shield 14 here increases towards the carrier arm 3, such that the upper deflecting device 12 always supports the upper spring strips 9 at approximately the same distance from the lower edges thereof. Seen from the side, the course of the upper deflecting device 12 thus runs parallel to the course shown in FIG. 1 of the lower edges of the upper spring strips 9.

The upper deflecting device 12 may also consist of a round profile, in particular of plastic.

Figure 4:
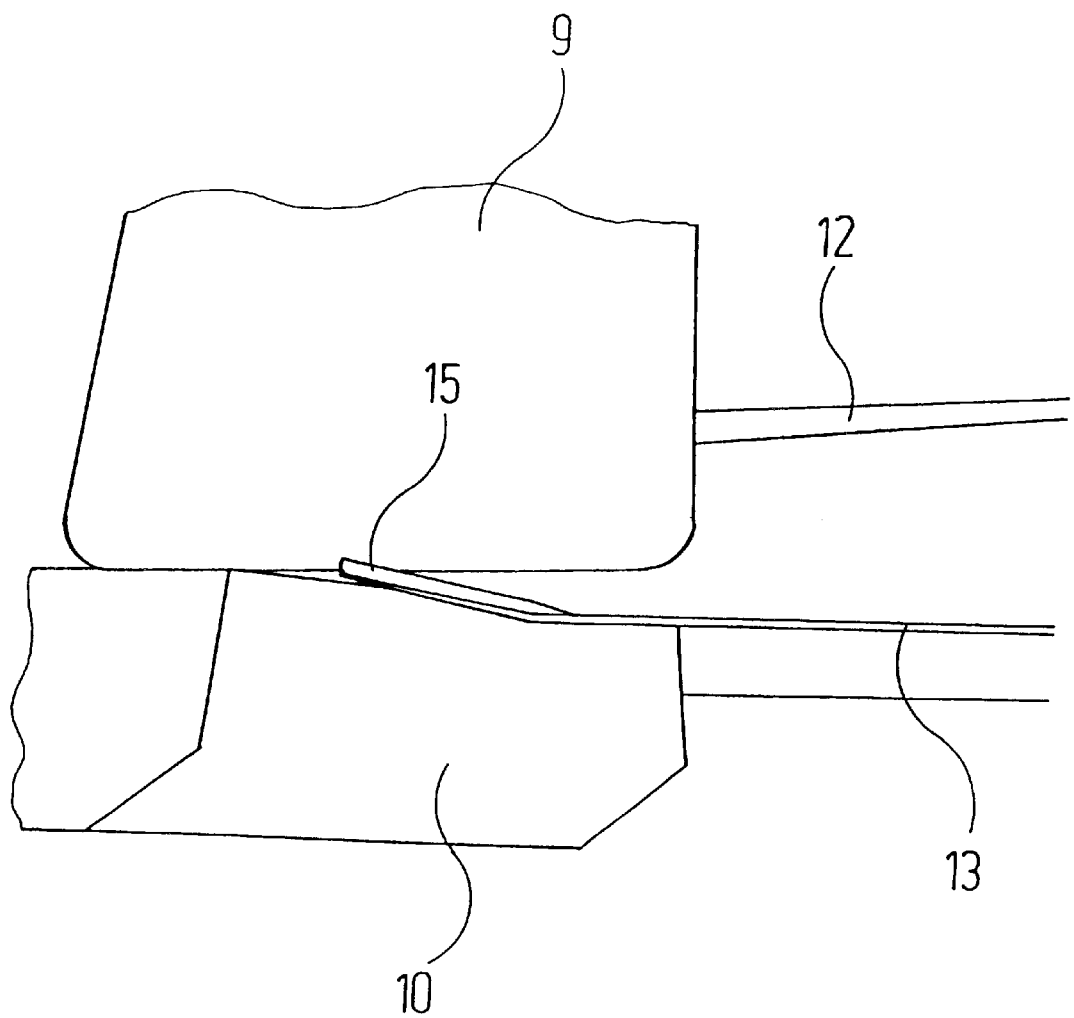
FIG. 4 is a magnified detail from FIG. 3.

The lower deflecting device 13 is also formed by a strip of sheet metal, which is attached to the sheet metal shield 14. The two opposite ends of the deflecting device are somewhat bent out upwards from the plane of the drawing of FIGS. 3 and 4, i.e. towards the inside of the treatment booth, and simultaneously somewhat turned such that the inclination of their surface approximately corresponds to the inclination of the lower spring strips 10 in the resting position thereof. When the lower deflecting device 13 moves together with the electric line 4 along the slot, in FIGS. 3 and 4 thus for example to the left, the corresponding bent-out end 15 presses the free edge of the lower spring strip 10, with which it comes into contact, downwards, so bending the upper end zone of the lower spring strip 10 towards the outside of the treatment booth.

As is in particular clear from FIG. 3, the lower deflecting device 13 runs substantially parallel to the slot 2 and tangentially past the carrier arm 3. The upper, free edge zones of the lower spring strips 10 follow a corresponding movement path.

As is clear from the above description, the upper spring strips 9 and the lower spring strips 10 are bent out in opposite directions by the two deflecting devices 12, 13 in the vicinity of the carrier arm 3: the upper spring strips 9 are bent in towards the interior of the treatment booth, while the lower spring strips 10 are bent out towards the outside of the treatment booth.

As FIG. 5 shows, a bellows 16 extends as a further sealing element along the entire length of the slot 2 on the outside of the sealing arrangement 8, which bellows folds horizontally outside the zone of the carrier arm 3. A deflector 17 is attached to the electric telpher line 4, which deflector has two sloping faces 18, 19 which rise in opposite directions towards the carrier arm 3. In FIG. 5, when the electric telpher line 4 moves along the slot 2, the bottom of the bellows 16 is lifted by the advancing sloping face 18 to a height at which it can slide over the carrier arm 3. Once the carrier arm 3 has passed by, the bottom of the bellows 16 drops back down along the second sloping face 19.

The above-described dip coating apparatus operates as follows:

It is assumed that there is a workpiece, which is to be passed through a coating bath, located on the internal end, shown in FIG. 1, of the carrier arm 3. In the zone in which the carrier arm 3 breaks through the sealing arrangement 8, the spring strips 9, 10 are bent in the manner represented in FIG. 1. Nevertheless, sprayed liquid cannot pass through freely at this point as such liquid is retained by the sheet metal shield 14 and, due to the inclination thereof, returned to the interior of the treatment booth. Even outside the break-through zone of the carrier arm 3, the spring strips 9, 10 have an inclination such that any impinging sprayed liquid flows back into the interior of the treatment booth.

In addition, the bellows 16 arranged on the outside of the sealing arrangement 8 ensure a virtually gas-tight seal. In any case, the coating losses still permitted by the bellows 16 are so low that, by means of an appropriate supply of air, an, albeit slight, overpressure may be maintained in the interior of the treatment booth so that it is possible to prevent any unwanted penetration of air from the ambient atmosphere.

When the electric telpher line 4 moves with the workpiece along the slot 2, the upper deflecting device 12 resiliently bends the upper spring strips 9, while the lower deflecting device 13 resiliently bends the lower spring strips 10, and the deflector 17 lifts the lower edge of the bellows 16. Once the carrier arm 3 has passed by, the spring strips 9, 10 and the bellows 16 return to their closed position.

Figure 6:
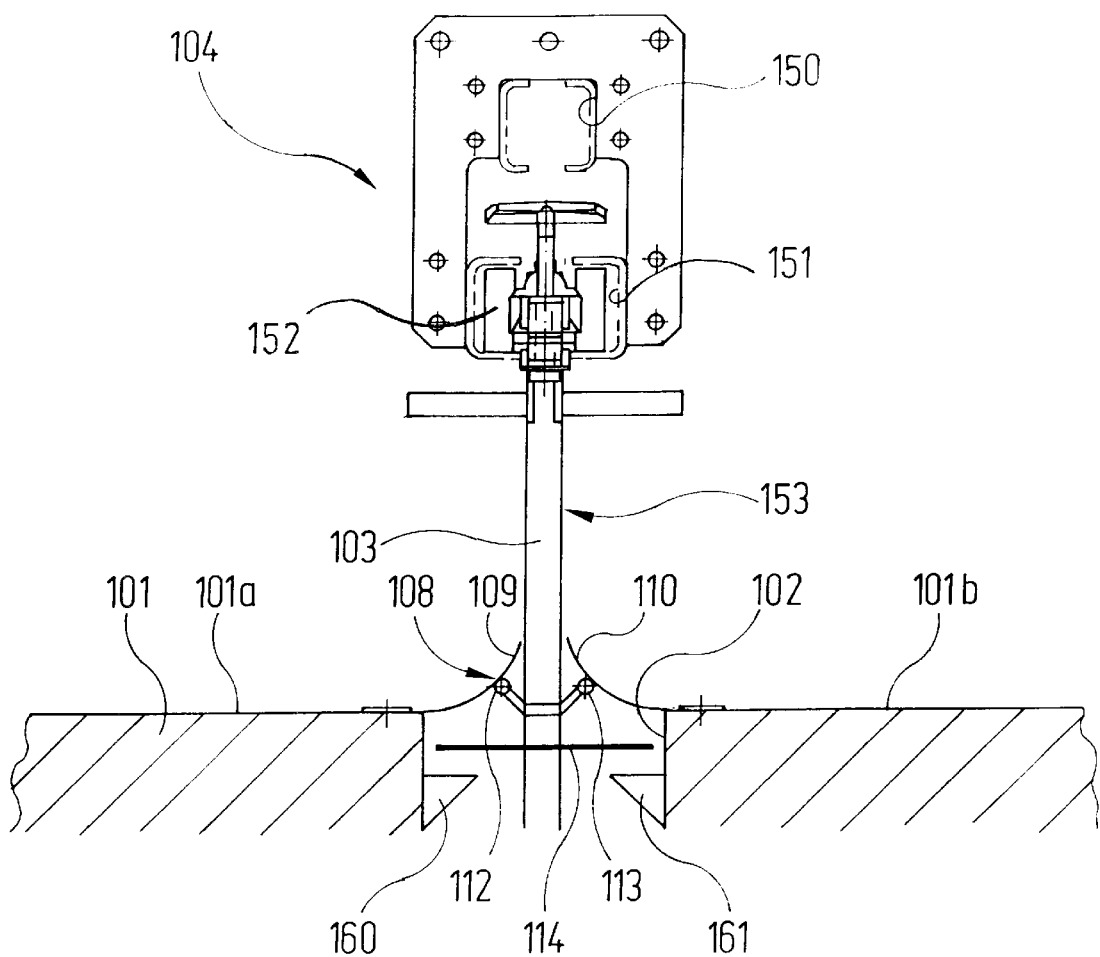
FIG. 6 is a section through the ceiling area of a dryer perpendicular to the direction of motion of the articles to be dried.
Figure 7:
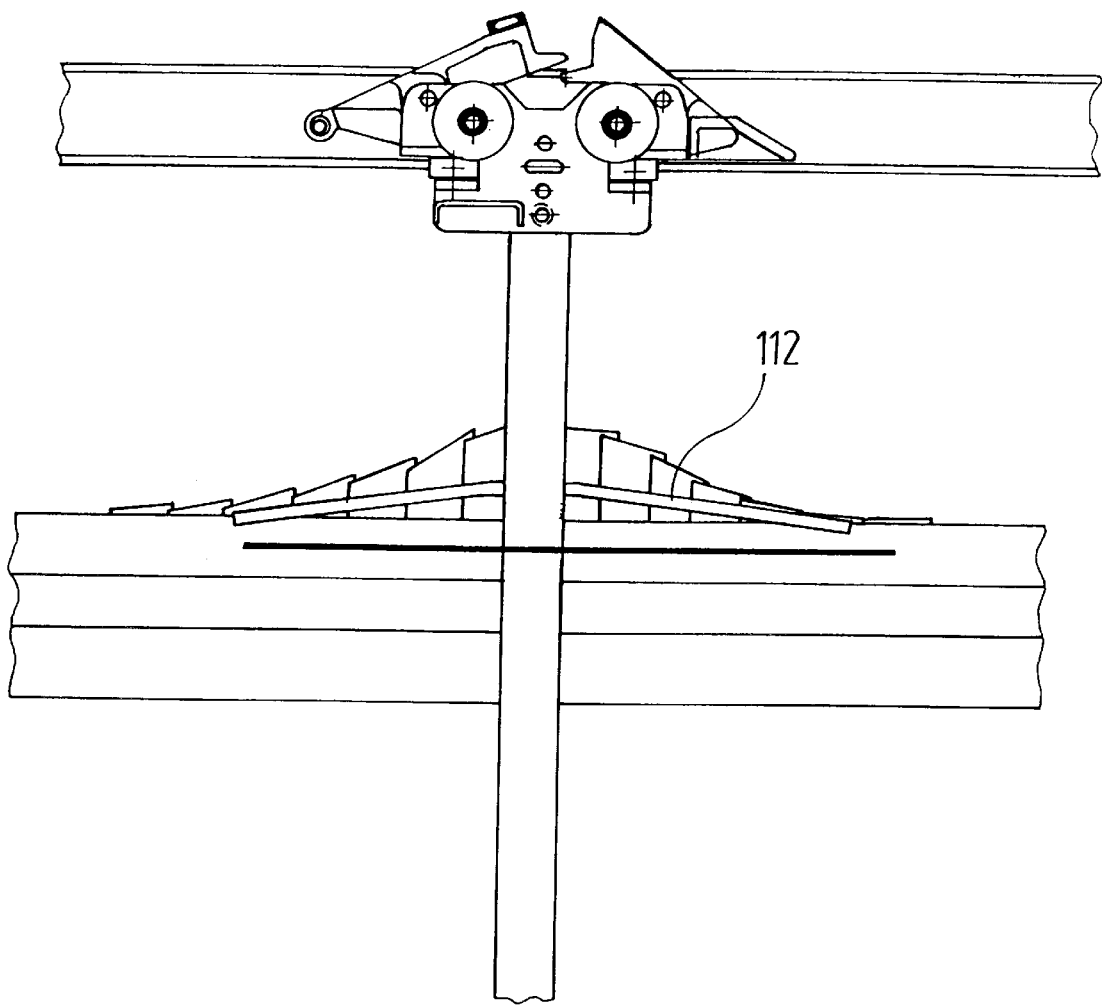
FIG. 7 is a section similar to FIG. 6, but parallel to the direction of motion of the articles to be dried.

FIGS. 6 and 7 show another exemplary embodiment of the invention, which is largely similar to the exemplary embodiment described above with the assistance of FIGS. 1 to 5. Corresponding elements are accordingly denoted by the same reference numerals plus 100.

In the Example shown in FIGS. 6 and 7, the treatment apparatus is a dryer, through the drying chamber of which the articles to be dried are conveyed using a power and free conveyor 104. As is known, this conveyor 104 comprises an upper rail 150, through which a conveying chain (not shown) is passed, together with a lower carrier rail 151 running parallel thereto, on which the trolleys 152 of the individual suspended carriers 153 run. FIGS. 6 and 7 show one of these suspended carriers 153 with the upper zone thereof.

Each suspended carrier 153 has a vertical carrier arm 103, which passes through a slot 102 in the ceiling 101 of the dryer. A sealing arrangement 108 seals this slot 102. Said arrangement comprises one set of spring strips 109 lying on one side of the slot 102 together with a second set of spring strips 110 lying on the opposite side of the slot 102, each set of which is respectively attached by the zones thereof remote from the slot 102 to the associated portion 101a and 101b of the ceiling 101 and which, in the resting position remote from the carrier arm 103, overlap laterally within each set while the zones of each set oriented towards one another also overlap.

The carrier arm 103 has deflecting devices 112, 113, one on each side, which take the form of a strip of sheet metal. Unlike in the first described exemplary embodiment, these deflecting devices 112, 113 are symmetrical to a plane perpendicular to the plane of the drawing of FIG. 6 and each is configured as has been described above for the deflecting device 12 of the apparatus of FIGS. 1 to 5. Accordingly, on passage of the carrier arm 103, the deflecting devices 112, 113 bend the spring strips 109, 110 of both sets symmetrically outwards in the same direction.

Beneath the spring strips 109, 110, a horizontal shield 114 is attached to the carrier arm 103, which lies with its peripheral zones which extend parallel to the direction of motion of the conveyor 104 above two strips 160, 161 which are provided on the side walls of the slot 102.

In conjunction with the shield 114, the sealing arrangement 108 prevents the escape of the hot gases of the internal atmosphere of the dryer and the penetration of cold fresh air on passage of the carrier arm 103, so improving the thermal efficiency of the dryer.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. An apparatus for the treatment of workpieces comprising:
    a) a treatment chamber, in which a treatment zone for the workpieces is located, the treatment chamber comprising at least one wall;
    b) a conveyor, which guides the workpieces through the treatment chamber, the conveyor further comprising:
        ba) at least one conveyor element outside the treatment chamber; and
        bb) at least one carrier arm, which extends through a slot, extending along the conveyor's path of motion, in the at least one wall of the treatment chamber;
    c) a sealing arrangement which seals the slot in the at least one wall of the treatment chamber, the sealing arrangement is capable of being opened in each case locally in the vicinity of the carrier arm to allow passage of the carrier arm and, the sealing arrangement further comprising a plurality of mobile sealing elements, said sealing elements being implemented by
        ca) a first set of spring strips, which overlap laterally and are attached in an area remote from the slot to a portion lying on one side of the slot of the at least one wall of the treatment chamber;
        cb) a second set of spring strips, which overlap laterally and are attached in an area remote from the slot to a portion lying on the other side of the slot of the at least one wall of the treatment chamber;
    wherein,
        cc) in their resting position, the mutually facing end zones of the spring strips belonging to the first set and of the spring strips belonging to the second set overlap resiliently;
    d) a first deflecting device which is movable by the conveyor together with the carrier arm and, when moved, engages beneath the first set of spring strips and bends them out resiliently in such a manner that the carrier arm can pass along the first set of spring strips;
    e) a second deflecting device which is movable by the conveyor together with the carrier arm and, when moved, bends out the second set of spring strips resiliently in such a manner that the carrier arm can pass along the second set of spring strips.

2. An apparatus according to claim 1, wherein the spring strips comprise a spring steel.

3. An apparatus according to claim 1, wherein the spring strips comprise a stainless steel.

4. An apparatus according to claim 1, wherein the spring strips comprise a plastic material.

5. An apparatus according to claim 1, further comprising a shield, which is movable together with the carrier arm, the shield covering that zone of the sealing arrangement in which one of the first set and second set of spring strips are bent out of their resting position.

6. An apparatus according to claim 1, wherein the deflecting devices comprise strips of sheet metal which are bent in such a manner that the surfaces thereof extend approximately parallel to the areas of the spring strips lying thereagainst.

7. An apparatus according to claim 6, wherein the deflecting devices are guided such that they lie against at least one of the first and second spring strips everywhere at approximately the same distance from the edges thereof.

8. An apparatus according to claim 1, further comprising:
    a bellows positioned such that the slot between a first portion and a second portion of the wall of the treatment chamber is additionally closed on an outside thereof; and
    a deflector being movable with the carrier arm and comprises at least one sloping face, against which one edge of the bellows rests locally and which displaces the edge of the bellows in such a manner that the carrier arm can pass along the bellows.

9. An apparatus according to claim 1, wherein the first and second deflecting devices are configured symmetrically with regard to a plane substantially perpendicular to the direction of conveying in such a manner that the deflecting devices are effective in a forwards and a backwards direction of the conveying motion.

10. An apparatus according to claim 1, wherein the treatment chamber comprises a booth in which a workpiece is surface treated, and the wall in which the slot is located comprises a substantially vertical wall of the booth.

11. An apparatus according to claim 10, wherein the spring strips belonging to the different sets are bent out in different directions by the deflecting devices.

12. An apparatus according to claim 1, wherein the treatment chamber comprises a chamber of a dryer or oven and wherein the wall in which the slot is located is the ceiling of the dryer or oven chamber.

13. An apparatus according to claim 12, wherein the first and second steps of spring strips (are bent out in substantially a same direction by the first and second deflecting devices.

* * * * *